United States Patent [19]

Yasunaga et al.

[11] Patent Number: 4,873,154
[45] Date of Patent: Oct. 10, 1989

[54] MAGNETIC RECORDING MEDIUM CONTAINING FE, CO, N AND O

[75] Inventors: Tadashi Yasunaga; Akio Yanai, both of Kanagawa, Japan

[73] Assignee: Fuji Photo Film Co., Ltd., Kanagawa, Japan

[21] Appl. No.: 151,722

[22] Filed: Feb. 3, 1988

[30] Foreign Application Priority Data

Feb. 4, 1987 [JP] Japan ................................ 62-24378

[51] Int. Cl.$^4$ .............................................. G11B 5/64
[52] U.S. Cl. ..................................... 428/694; 427/128; 427/132; 428/702; 428/900
[58] Field of Search ............... 428/694, 702, 900, 336; 427/128, 132

[56] References Cited

U.S. PATENT DOCUMENTS

| 4,362,767 | 12/1982 | Nouchi ................................ 427/130 |
| 4,452,857 | 6/1984 | Yamazaki ............................ 428/900 |
| 4,673,610 | 6/1987 | Shirahata et al. ................... 428/694 |
| 4,726,988 | 2/1988 | Oka et al. ............................. 428/695 |
| 4,801,500 | 1/1989 | Yasunaga et al. ................... 428/900 |

FOREIGN PATENT DOCUMENTS 122030 10/1984 European Pat. Off. .
207426 11/1984 Japan .

Primary Examiner—George F. Lesmes
Assistant Examiner—J. B. Monroe
Attorney, Agent, or Firm—Sughrue, Mion, Zinn, Macpeak, and Seas

[57] ABSTRACT

A magnetic recording medium, such as a tape, having a thin ferromagnetic film containing $Fe_aCo_bN_cO_d$ satisfying: $32\% \leq a \leq 90\%$; $5\% \leq b \leq 55\%$; $2\% \leq c \leq 28\%$; $5\% \leq d \leq 23\%$; and $c+d \leq 40\%$. Such a film provides enhanced resistance against corrosion.

3 Claims, 1 Drawing Sheet

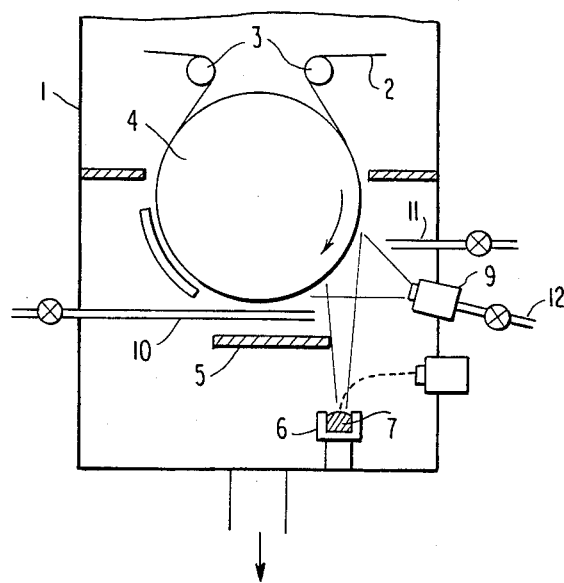

MAGNETIC RECORDING MEDIUM CONTAINING FE, CO, N AND O

BACKGROUND OF THE INVENTION

1. Field of the Invention

The present invention relates to a magnetic recording medium having a thin ferromagnetic metal film and more particularly it relates to a magnetic recording medium having excellent anti-corrosive property.

2. Background Art

The demand for higher recording density in a magnetic recording system has recently increased. In this connection, a thin metal film type magnetic recording medium having a thin ferromagnetic metal film formed by a vacuum evaporation method or a sputtering method has been studied as a replacement for a conventional coating type magnetic recording medium for a recording layer.

In such a thin metal film type magnetic recording medium, there is formed a thin metal film composed of ferromagnetic metal alloy having high saturation magnetization and having a thickness of from 50 to 500 nm. Accordingly, the thickness of the magnetic layer is decreased one or two orders of magnitude below the thickness of the conventional coating type magnetic layer, thereby reducing the effects of demagnetization in the short wavelength region, and thus high density recording has been realized. Furthermore, in this thin metal film type, it is unnecessary to use organic solvents in a large amount unlike the coating type of magnetic film, and therefore, the manufacturing equipment can be simplified.

The types of ferromagnetic materials include iron, cobalt, nickel or alloys thereof. When cobalt is used, the desirable high coercive force can be relatively easily obtained due to its high monoaxial crystal magnetic anisotropy. For example, a cobalt nickel alloy thin film prepared as a magnetic tape by an inclined vapor deposition method has widely been studied.

In order to improve the environmental resistance and durability of such a thin metal film type magnetic recording medium, a method of nitrogenating the surface of a magnetic layer by an ion plating method has been disclosed in Japanese Patent Application (OPI) No. 33806/1975. (The term "OPI" used herein means an unexamined published application.) A method of providing a silicon nitride film by sputtering has been disclosed in Japanese Patent Application (OPI) No. 30304/1978. A method of forming a non-magnetic layer on a magnetic layer by exposing the magnetic layer to the discharge of nitrogen gas has been disclosed in Japanese Patent Application (OPI) No. 85403/1978. A method of providing a nitrogenated metal thin film on a thin magnetic metal film has been disclosed in Japanese Patent Application (OPI) No. 143111/1979. A thin magnetic film composed of iron nitride, or iron and iron nitride has been disclosed in European Patent No. 8328 and Japanese Patent Application (OPI) No. 87809/1984. Further, one of the inventors of the present invention with others suggested in their earlier application (Japanese Patent Application (OPI) No. 54023/1986) a magnetic recording medium comprising a non-magnetic support having provided thereon a thin magnetic film mainly comprised of iron nitride oxide. The composition of the thin magnetic film is shown by the following composition.

$Fe_{1-x-y}N_xO_y$, $0.25 \leq x+y < 0.60$

A commonly assigned U.S. patent application, Ser. No. 133,829, filed Dec. 16, 1987 also discloses an iron nitride oxide magnetic film in which $x+y \leq 0.25$.

On the other hand, a cobalt chromium alloy thin film prepared for a magnetic disk by a sputtering method has been extensively studied.

The magnetic layer of the above medium has an apparent mirror-like surface, but microscopically has a structure having metallic fine particles of a particle size from 10 to 100 nm. Therefore, when dew condenses on the magnetic layer or when the magnetic recording medium is exposed to an atmosphere containing gaseous sulfurous acid, the magnetic recording medium easily corrodes. Even if an extremely slight amount of corrosion is present on the surface of a magnetic recording medium, it comes off when the medium rubs against a magnetic head or other parts, thereby causing head clogging or dropouts.

In order to remove the above defect, an inorganic or organic protective layer on a thin metal film has been proposed.

However, if the above-described protective layer is provided, it must be thick to obtain good results, which is unfavorable in view of spacing loss. The above-described magnetic recording medium which is mainly comprised of iron nitride or iron nitride oxide has improved environmental resistance and improved anti-corrosive property, but still there is a defect in that saturation magnetization is not high enough to obtain high outputs.

SUMMARY OF THE INVENTION

An object of the present invention is to provide a magnetic recording medium having good anti-corrosive property and high magnetic properties, which is free from the above-described defects.

BRIEF DESCRIPTION OF THE DRAWING

The single drawing shows an apparatus for preparing a magnetic recording medium of the present invention by a vapor deposition method.

DETAILED DESCRIPTION OF THE PREFERRED EMBODIMENT

The above defects can be avoided upon using iron and cobalt as ferromagnetic metals contained in a magnetic layer and forming a nitrogenated and oxidized thin film by combining iron and cobalt partially with nitrogen and oxygen and by properly defining the composition of the above-described iron, cobalt, nitrogen and oxygen within a predetermined range.

That is, the present invention relates to a magnetic recording medium comprising a non-magnetic support over which there is formed a thin ferromagnetic metal film mainly comprising iron and cobalt. The thin metal film also contains nitrogen and oxygen, and when the contents (atomic percentages based on the total number of the following atoms) of iron, cobalt, nitrogen and oxygen are represented in terms of a, b, c, d, (that it, $Fe_aCo_bN_cO_d$) the contents meet the following limits:

$32 \leq a \leq 90$ $5 \leq b \leq 55$ $2 \leq c \leq 28$ $5 \leq d \leq 23$ $c + d \leq 40.$ In this magnetic recording medium, it is preferred that the contents (atomic percentages) of iron, cobalt, nitrogen and oxygen contained in the thin metal film are within the following restricted ranges:

$45 \leq a \leq 85$ $15 \leq b \leq 45$ $3 \leq c \leq 20$ $10 \leq d \leq 22$ $c + d \leq 40.$ It is further preferred that c is about 10 and d is from 10 to 17.

The structure of the metal thin film containing iron, cobalt, nitrogen and oxygen are unclear, but they are believed to be a mixture or a composite substance of pure iron, pure cobalt, iron nitride, iron oxide, cobalt nitride and cobalt oxide.

Various structures of iron nitride $Fe_xN$ are known. Ferromagnetic iron nitride is in the form of $Fe_4N$ and $Fe_8N$ (which is also represented as $Fe_{16}N_2$). When the contents of the above-described compositions fall within the ranges as defined above, it is possible to form a magnetic recording medium having a nitrogenated and oxidized thin film with high saturation magnetization having good environmental resistance and anti-corrosive property.

A magnetic vapor deposited film can be formed as a magnetic layer of a thin metal film on a non-magnetic support by a so-called inclined vapor deposition method. That method comprises heating an iron cobalt alloy contained in a crucible with electron beams and the like, thereby vaporizing iron and cobalt atoms, and jetting the resulting ion stream flow on the non-magnetic support at an inclined angle preferably of not less than 20° and more preferably of 30° or more. In this instance, ion beams containing at least nitrogen ions formed by an ion gun are introduced to the vapor deposition area so that ion beams react with iron and cobalt particles. Oxygen may react as an ion with nitrogen ions in the stream flow, or may be present as an atmospheric gas at the vapor deposition area.

Regarding the ratio of elements contained in the magnetic layer, the ratio of iron and cobalt is controlled by adjusting the power of the electron beams and by adjusting the composition of alloy. The ratio of nitrogen and oxygen is controlled by adjusting the amounts of nitrogen gas and oxygen gas supplied in an ion gun or by adjusting the residual gas pressure in a vacuum bath.

The sole FIGURE shows an exemplary apparatus for forming a thin metal film of the present invention. In a vacuum chamber 1, there are installed a system for conveying a non-magnetic support 2 and underneath it, a vapor source and an ion source for introducing metal vapor flow and nitrogen oxygen ions. The non-magnetic support 2 is conveyed along the periphery of a cylindrical drum 4 through transporting rollers 3. An iron cobalt alloy 7 is put as a vapor deposited material in a crucible 6. An electron beam from an electron gun 8 is directed to the iron cobalt alloy 7 to vaporize the iron and cobalt atoms. The resulting vapor flow jets to the travelling support 2 at an inclined angle through a mask 5. Gas containing nitrogen is introduced through a source line 12 into an ion gun 9 which ionizes the nitrogen and the ion beams are shot to the vapor deposition area. At the same time, gas containing oxygen is introduced from gas source line 10 or 11 in an appropriate proportion so that the oxygen partial pressure at the vapor deposition area is kept constant. The total pressure at the vapor deposition area depends upon the vaporized amount of the iron cobalt alloy and the degassing ability of a vacuum pump, but is generally from $10^{-2}$ to $10^{-4}$ Pa.

The thickness of the magnetic layer in a magnetic recording medium of the present invention is generally from 30 to 5000 nm, preferably from 50 to 500 nm.

The non-magnetic support used in the present invention includes a plastic support such as polyethylene terephthalate, polyimide, polyamide, polyvinyl chloride, cellulose triacetate and polycarbonate.

The thus prepared magnetic recording medium must run smooth and have sufficient durability in a recording and reproducing apparatus. Accordingly, when the medium is used as a magnetic tape, a suitable protective and lubricating layer may be provided on the magnetic layer and a backing layer may be provided on the surface of the support opposite to the magnetic layer.

The present invention will be illustrated in more detail by the following Example but should not be limited thereto.

EXAMPLE 1

A magnetic thin film having a 150 nm thickness and containing iron, cobalt, nitrogen and oxygen was formed on a polyethylene terephthalate film having a 12.5 micrometer thickness by the above-described method using the apparatus as shown in the figure. The angle of incidence at which vapor flow of iron and cobalt were jetted on a support was between 70° and 90°. When an iron cobalt alloy having various compositions was vaporized, ion beams containing nitrogen ions were jetted to form a thin magnetic film. Samples (Sample Nos. 1 to 5 and Comparative Sample Nos. 6 to 10) having various amounts of oxygen and nitrogen incorporated into the magnetic thin film were prepared by varying the irradiation amounts of ion beams containing nitrogen jetted from an ion gun and by varying the amounts of oxygen gas introduced from the gas introducing system 10 or 11.

The compositions of samples thus prepared were analyzed by an Auger electron spectometer ("PHI 560" manufactured by Perkin Elmer Co., Ltd.).

As a lubricating agent, stearic acid in an amount of from 6 mg/m$^2$ to 12 mg/m$^2$ was coated on the thus obtained samples and a backing layer containing carbon black was provided thereon. Thereafter, those samples were cut to a width of 8 mm. Outputs of those samples at 6 MHz were measured using an 8 mm VTR ("FUJIX-8M6" manufactured by Fuji Photo Film Co., Ltd.). An 8 mm tape manufactured by Fuji Photo Film Co., Ltd. was used as a standard tape.

The anti-corrosive property of those samples was evaluated by observing the surface of a magnetic layer after a 5% aqueous solution of sodium chloride was jetted on the samples as a mist and the samples were allowed to stand at 60° C. and 90% RH for 48 hours. The degree of corrosion was evaluated on three levels.

A: No corrosion was observed.
B: Slight corrosion was observed.
C: Corrosion was clearly observed.
The results are shown in the following Table.

TABLE

| Sample No. | Composition | | | | Outputs at 6 MHz (dB) | Corrosion resistance against NaCl |
| --- | --- | --- | --- | --- | --- | --- |
| | a | b | c | d | | |
| 1 (Example) | 40 | 37 | 9 | 14 | +7 | A |
| 2 (Example) | 40 | 37 | 5 | 18 | +6 | A |
| 3 (Example) | 56 | 20 | 8 | 16 | +5 | A |
| 4 (Example) | 56 | 20 | 18 | 6 | +5 | A |
| 5 (Example) | 61 | 15 | 8 | 16 | +5 | A |
| 6 (Comparative Example) | 74 | 2 | 9 | 15 | +2 | A |
| 7 (Comparative Example) | 74 | 2 | 1 | 23 | −3 | B |
| 8 (Comparative Example) | 12 | 65 | 9 | 14 | −5 | C |
| 9 (Comparative Example) | 12 | 64 | 1 | 23 | −7 | C |
| 10 (Comparative Example) | 48 | 40 | 8 | 4 | High output Fluctuation | A |
| Standard 8 mm tape | | | | | 0 | A |

The magnetic recording medium of the present invention has higher outputs at 6 MHz than the medium having a conventional iron nitride oxide thin film and is therefore, suitable for higher density recording. Regarding corrosive resistance, the present invention is better than the medium having the conventional iron nitride oxide thin film and is a s good as a metal tape. When the additive amount of cobalt is too low, the effects of the present invention cannot be obtained. However, if the content is raised too high, the anti-corrosive property deteriorates. Regarding the content of nitrogen, when the content is too low, the anti-corrosive property deteriorates, and when the content is too high, the magnetic properties greatly deteriorate, thereby decreasing the output levels. Regarding the oxygen content, when the content is too low, output fluctuations become high. That means that a magnetic layer wears out with difficulty when oxygen is present in a certain amount.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising a non-magnetic support having provided thereon a thin ferromagnetic metal film comprising iron of atomic percentage a, cobalt of atomic percentage b, nitrogen of atomic percentage c and oxygen of atomic percentage d, wherein said atomic percentages of said iron, cobalt, nitrogen and oxygen are based on the total number of these atoms and have the following limits:

$32 \leq a \leq 90$;

$5 \leq b \leq 55$;

$2 \leq c \leq 28$;

$5 \leq d \leq 23$; and $c + d \leq 40$.

2. A magnetic recording medium as recited in claim 1, wherein said atomic percentages are further limited to:

$45 \leq a \leq 85$;

$15 \leq b \leq 45$;

$3 \leq c \leq 20$;

$10 \leq d \leq 22$; and $c + d \leq 40$.

3. A magnetic recording medium as recited in claim 1, wherein c is approximately 10 and $10 \leq d \leq 17$.

* * * * *